(12) United States Patent
Sundborger

(10) Patent No.: US 7,114,458 B2
(45) Date of Patent: Oct. 3, 2006

(54) NOTIFICATION METHOD AND SYSTEM

(75) Inventor: Helene Sundborger, Uppsala (SE)

(73) Assignee: Delaval Holding AB, Tumba (SE)

( * ) Notice: Subject to any disclaimer, the term of this patent is extended or adjusted under 35 U.S.C. 154(b) by 0 days.

(21) Appl. No.: 10/297,171

(22) PCT Filed: May 31, 2001

(86) PCT No.: PCT/SE01/01220

§ 371 (c)(1),
(2), (4) Date: Jun. 2, 2003

(87) PCT Pub. No.: WO01/93667

PCT Pub. Date: Dec. 13, 2001

(65) Prior Publication Data

US 2004/0089246 A1    May 13, 2004

(30) Foreign Application Priority Data

Jun. 5, 2000    (SE) .................................. 0002082

(51) Int. Cl.
*A01J 3/00*    (2006.01)
*A01J 5/00*    (2006.01)
(52) U.S. Cl. .................. 119/14.02; 119/14.03; 119/14.14; 119/520
(58) Field of Classification Search ............. 119/815, 119/14.03, 14.02, 14.08, 14.14, 520, 712, 119/721, 730
See application file for complete search history.

(56) References Cited

U.S. PATENT DOCUMENTS

| | | | | |
|---|---|---|---|---|
| 4,247,758 A | * | 1/1981 | Rodrian ........................ | 377/6 |
| 4,798,175 A | * | 1/1989 | Townsend et al. ....... | 340/572.7 |
| 5,606,932 A | * | 3/1997 | van der Lely ........... | 119/14.14 |
| 5,771,837 A | * | 6/1998 | van der Lely ........... | 119/14.02 |
| 5,790,047 A | | 8/1998 | Golan | |
| 5,957,081 A | * | 9/1999 | van der Lely et al. .... | 119/14.09 |
| 5,996,529 A | * | 12/1999 | Sissom et al. ........... | 119/14.14 |
| 6,019,061 A | * | 2/2000 | Schulte ..................... | 119/14.03 |
| 6,405,672 B1 | * | 6/2002 | De Mol et al. .......... | 119/14.15 |
| 6,539,896 B1 | * | 4/2003 | Larsen ....................... | 119/515 |
| 6,571,730 B1 | * | 6/2003 | Norberg ................... | 119/14.03 |

(Continued)

FOREIGN PATENT DOCUMENTS

EP        000635204 A1 *   7/1994

(Continued)

OTHER PUBLICATIONS

RD 423029A, Jul. 1999, Anonymous.*

(Continued)

*Primary Examiner*—Andrea M. Valenti
(74) *Attorney, Agent, or Firm*—Harness, Dickey & Pierce, P.L.C.

(57) ABSTRACT

A method for automatically error notifying a user of a dairy farm, wherein milking animals, such as cows, are allowed to move freely in an area (1) intended therefore and to visit individually a milking animal station, such as e.g. a milking parlor (9) with a fully automatic milking machine (14), or a feeding station (33), said station comprising an animal identification system (20, 43), and a database of the animals, said method comprising the steps of receiving a pre-selection of a particular milking animal of the milking animals in the database; identifying each milking animal that visits the station; and notifying the user of the dairy farm of the animal in dependence on the pre-selected milking animal visiting the station. The method may be implemented by means of a computer software product loaded into a computer of an animal station or of a dairy farm system.

9 Claims, 2 Drawing Sheets

U.S. PATENT DOCUMENTS 6,679,195 B1 * 1/2004 Birk .................. 119/14.03

FOREIGN PATENT DOCUMENTS

| EP | 0636313 | A2 | 2/1995 |
| EP | 0663146 | B1 | 7/1995 |
| EP | 0857412 | A1 | 8/1998 |
| EP | 0857418 | A2 | 8/1998 |
| WO | 9619917 | | 7/1996 |
| WO | 9705768 | A1 | 2/1997 |
| WO | WO 97/39618 | * | 10/1997 |
| WO | 9930277 | A1 | 6/1999 |
| WO | WO 99/30277 | * | 6/1999 |

OTHER PUBLICATIONS

Anonymous; WPI, 1999-492333; Abstract Only, Jul. 10, 1999.

* cited by examiner

DATABASE

| COW NO. | PRE-SELECTION | COMMENT |
|---|---|---|
| 1 | — | |
| 2 | YES | OINTMENT TREATMENT |
| 3 | — | |
| 4 | — | |
| 5 | — | |
| 6 | — | |
| 7 | YES | EXAMINATION |
| 8 | — | |
| 9 | — | |
| 10 | — | |

Fig. 2

NOTIFICATION METHOD AND SYSTEM

TECHNICAL FIELD OF THE INVENTION

The present invention generally relates to dairy farming and particularly to a method for automatically notifying a user of a dairy farm, and to a computer program product, a milking animal station, and a dairy farm system, respectively, for performing the method.

DESCRIPTION OF RELATED ART AND BACKGROUND OF THE INVENTION

In modern dairy farm industry there are continuous research and development activities in order to improve the efficiency of various activities such as machine milking, which, inter alia, involves increased milk yield and reduced milking time.

A major trend in this respect is an increased degree of automation of the various activities. For instance, machine milking may be performed by milking robots in a completely automated manner. Such an automatic milking system may take care of milking, feeding, milk inspection, milk sampling, animal traffic, etcetera in a large area wherein the dairy animals are walking about freely. This implies that the user of the system, i.e. the farmer, can leave the barn for many hours if everything is progressing appropriately.

Some activities are nevertheless performed more or less manually. For instance, if a particular dairy animal is under a treatment, receiving pharmaceutical drugs or is to be rubbed with an ointment or a salve, this particular animal has to be found for manual inspections and/or treatments. In a large area farm where the dairy animals are walking about freely it is a hard and time consuming work to find the animal of interest. Further, when the animal is found it may be difficult to keep the animal still during the treatment or examination.

Further, some treatments ought to be performed in connection with milking.

U.S. Pat. No. 5,790,047 issued to Golan depicts a system for marking a cow with a visible marking indicative of a treatment to be carried out on the cow, comprising an identification tag located on the cow and bearing a unique identity code for remotely identifying the cow, and a database containing for each cow in a heard a corresponding identity code and a treatment code relating to a treatment to be carried out on the cow. The cow passes through a paint spray station en route between a milking parlor and corral, said station identifying the cow and including different colored spray guns responsive to the treatment code for marking on the cow a visible marking uniquely identifying the treatment code.

Said U.S. Patent does not, however, disclose how nor where to find a particular animal of interest. Further, the system with spray guns seems to be impractical if just one or a few particular animals are to be treated.

SUMMARY OF THE INVENTION

It is an object of the present invention to provide a method for automatically notifying a user of a dairy farm, wherein milking animals, such as cows, are allowed to move freely in an area intended therefore and to visit individually a milking animal station, such as e.g. a stall, a milking parlor, or a feeding station, said station comprising an animal identification system, and a database of the animals, when a particular milking animal is located.

It is yet a further object to provide such an inventive method that is simple, reliable, of low cost, and easy to implement.

It is still a further object to provide such an inventive method that can alert the user immediately or at least at a minimum of delay subsequent to such location.

These objects among others are, according to one aspect of the invention, attained by a method as claimed in any of claims 1–9.

Preferably, the particular milking animal is pre-selected by the user. Such animal may be a milking animal that is to be examined or to be treated in some manner, such as to be rubbed with an ointment or a salve, or to be given a drug or a medicament. The milking animal may alternatively be an animal, which is not used to a particular equipment such as an automatic milking machine, and thus gets anxious and nervous.

If the animal station is a milking parlor the milking machine thereof is preferably automatically shut-off when the particular animal is identified.

The user may be notified by means of a telephone, a mobile phone, a pager or a Bluetooth compatible unit. The notification may be a voice or text message, or alternatively an alarm signal, particularly a sound alarm.

If the method is implemented into several milking animal stations the notification advantageously includes an identification of the animal station that has located the particular animal.

It is appreciated that the present invention is easily integratable in existing automatic dairy farm apparatus.

Further objects of the present invention are to provide an animal station and a dairy farm system for performing the inventive method.

Consequently, there is according to a second and a third aspect of the present invention provided an animal station and a dairy farm, respectively as claimed in claims 10 and 11.

Still a further object of the present invention is to provide a computer program product for performing the inventive method.

Thus, there is according to a fourth aspect of the present invention provided a computer program product as claimed in claim 12.

An advantage of the present invention is that the farmer does not need to search for, or to await the arrival of, a particular animal, and thus he may use his time more effectively.

A further advantage of the invention is that the animals are not disturbed or stressed in their natural behavior; e.g. their mutual ranking is not violated, and thus the animals stay calmer.

Further characteristics of the invention and advantages thereof will be evident from the following detailed description of embodiments of the invention.

In the following detailed description the milk producing animals are cows. However, the invention is not limited to cows, but is applicable to any animals having the capability to produce large quantities of milk, such as sheep, goats, buffaloes, horses, etc.

BRIEF DESCRIPTION OF THE DRAWINGS

The present invention will become more fully understood from the detailed description of embodiments of the present invention given hereinbelow and the accompanying FIG. 1, which is given by way of illustration only, and thus is not limitative of the present invention.

FIG. 2 displays schematically an example of an extract of a database comprised in a processing device of the animal arrangement of FIG. 1.

DETAILED DESCRIPTION OF EMBODIMENTS

Figure 1:
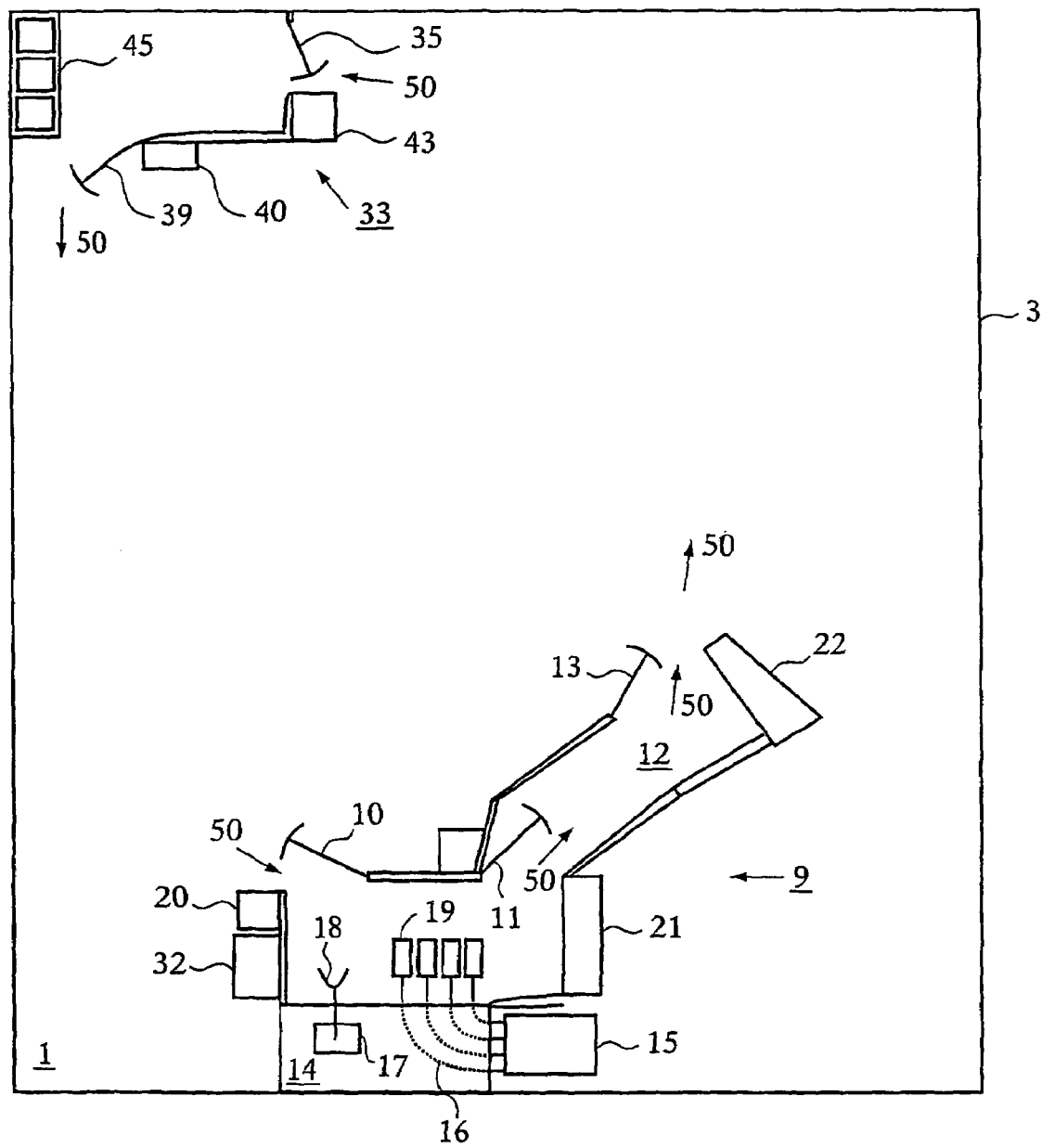
FIG. 1 displays schematically an embodiment of an animal arrangement for housing a herd of cows including an arrangement for automatically notifying a dairy farmer according to the present invention.

In the following description, for purposes of explanation and not limitation, specific details are set forth, such as particular techniques and applications in order to provide a thorough understanding of the present invention. However, it will be apparent to one skilled in the art that the present invention may be practiced in other embodiments that depart from these specific details. In other instances, detailed descriptions of well-known methods and apparatuses are omitted so as not to obscure the description of the present invention with unnecessary details.

FIG. 1. discloses an animal arrangement for housing a herd of cows. The arrangement comprises an area 1 defined by enclosure means 3 in the shape of a fence, a grid or the like. Area 1 is arranged to house cows permitted to walk about freely.

In area 1, there is provided a milking station or parlor 9 arranged for voluntary milking of the freely walking cows, i.e. the cows enter the milking station 9 in order to be milked when they need to. The milking station 9 comprises an enclosure having an inlet gate 10 and an outlet gate 11. Outside the outlet gate 11 there may be an exit space 12 to be passed by the cow leaving the milking station. The exit space 12 comprises a further outlet gate 13.

The milking station 9 comprises an automatic milking machine 14 connected to a milk storage tank 15 by means of milk lines 16. Milking machine 14 includes an automatic handling device 17 having a robot arm 18 arranged to automatically apply teatcups 19 of the milking machine to the teats of a cow present in the milking station 9.

Furthermore, the milking station 9 comprises an identification member 20 provided to identify a cow approaching the milking station 9. All of the gates 10, 11 and 13 are controllable by means of a schematically disclosed gate control device 31. Alternatively, gate 13 is a manually controlled one-way gate.

Further, automatic handling device 17, and gate control device 31 are connected to a central processing and control device 32. The central processing and control device 32 is responsible for central processing and controlling of the animal arrangement, and comprises typically a microcomputer, suitable software, and a database of the cows in the area 1.

Thus a cow approaching the milking station may be given access to the milking station after having been identified by the identification member 20 by opening of the inlet gate 10.

During milking, milk is drawn from the teats of the cow by means of vacuum being applied to the teatcups 19. The milk drawn is measured by means of one or several milk meters (not illustrated), whereafter it is collected in milk storage tank 15. Preferably, there is provided a milk meter for each teat cup for measuring the individual milk flow from each teat. Further, each teat cup is preferably connected individually by means of respective milk line 16 to milk storage tank 15.

After the milking has been completed the cow may leave the milking station 9 by opening of the outlet gates 11 and 13. The milking station 9 may also comprise a first feeding device 21 provided in the front end of the milking station 9 and a second feeding device 22 provided in the front end of the exit space 12.

A purpose of the first feeding device 21 is to entice the cow to enter the milking station 9 and to make her stand still during at least the attachment of the teatcups and a purpose of the second feeding device 22 is to entice the cow to leave the milking station 9 after the milking has been finished or is interrupted for any reason.

It is to be noted that the cow may be enticed to enter and leave the milking station 9 by other enticing means than the feeding devices 21, 22 disclosed. In this connection reference is made to WO 96/19917.

Furthermore, area 1 houses a stall or feeding station 33 accessible to the cows, i.e. the cows enter the feeding station 33 in order to eat and possibly drink when they need to. The feeding station 33 comprises an enclosure having an inlet gate 35 and an outlet gate 39.

The feeding station 33 houses an automatic feeding device 45 arranged to offer solid and liquid feed, such as concentrate, hay and water, to the cows. Furthermore, feeding station 33 comprises an identification member 43 provided to identify a cow approaching the feeding station 33. The gates 35 and 39 are controllable by means of a schematically disclosed gate control device 40. This gate control device 40 as well as gate control device 31 are preferably connected to the central processing and control device 32 located at the milking parlor 9, such that they are controllable therefrom.

Thus a cow approaching the feeding station may be given access to the feeding station after having been identified by the identification member 43 by opening of the inlet gate 35. The cow then enters inlet gate 35 and is automatically fed by means of feed device 45. After the feeding has been completed the cow may leave the feeding station 9 by opening of the outlet gate 39.

In FIG. 1 arrows 50 indicate schematically the flows of cows through milking parlor 9 and feeding station 33, respectively.

Further, it shall be noted that the first area 1 also may include more than one feeding supply station, separate solid and liquid supply stations as well as more than one single milking station 9.

According to the present invention a pre-selection of a particular cow of the cows in the database is received, preferably from the dairy farmer. The particular cow is a cow that is to be examined or treated manually by the farmer, or it is a cow (e.g. a heifer) not used to a particular equipment such as an automatic milking machine.

Further, each cow that visits milking station 9 or feeding station 33 is identified by means of respective animal identification system 20, 43. Then, the user of the dairy farm, i.e. the dairy farmer, is notified of the pre-selected cow in dependence on the pre-selected cow visiting any of the stations 9, 33.

The inventive concept is preferably implemented by means of a computer program product loadable into a memory of the processing and control device 32, the program product comprising software code portions for performing the inventive steps when said product is run on the processing and control device 32.

By such a method the dairy farmer is thus automatically notified when the pre-selected cow presents itself at milking station 9 or at feeding station 33. The farmer may then move to the station in question and examine, treat and/or calm down the pre-selected cow. Hence, the method provides the farmer with a notification of where a particular cow is at a given time. The farmer does not need to search for the cow manually, which can be hard and time consuming work if area 1 is large and houses a large number of cows. He just makes his pre-selection and then awaits the notifying while effectively using the time elsewhere at the farm.

The database held in processing and control device 32 of milking parlor 9 is, for the present purpose, provided with a further field for each cow, indicating whether the cow is pre-selected or not. FIG. 2 displays schematically an example of an extract of such a database. The database comprises here three fields for each cow. One field stores a cow identification number for identification of the respective cow; in the example of FIG. 2 cows 1–10 are listed. A second field specifies whether the cow is pre-selected or not; in the illustrated example cows Nos. 2 and 7 are pre-selected. Finally, the third field, which is optional, includes an action to be performed on the respective pre-selected cow; in the illustrated example cow No. 2 is to be rubbed with an ointment, whereas cow No. 7 is to be examined.

It shall be appreciated that the processing and control device 32 at the milking station is provided with an indicator unit and input/output means, such that the farmer can communicate with the device and can particularly input and change the records of the fields in the database. When the farmer want to find a cow he activates the pre-selection field for that cow and awaits the notifying of that cow. Subsequent to a notification of a particular pre-selected cow the pre-selection field for that cow is deactivated or, alternatively, it remains activated during a period of time or until the farmer deactivates it manually.

As mentioned, the cow that is the pre-selected is a cow to be treated, examined and/or calmed down. A pre-selection may thus be performed of a cow, which is to be rubbed with an ointment or a salve, of a cow which is to be given a drug or a medicament, or of an anxious cow.

The present invention is not limited to milking or feeding stations, but any location provided with an animal identification system and has access to the database may be capable of notifying the user.

In the case, however, of a notification from an automatic milking station, the automatic milking machine thereof is preferably halted or stopped, i.e. turned to a manual condition, while awaiting the user. Optionally, the user may be able to control the milking machine remotely, in particular return it to an automatic state (the farmer may be busy elsewhere and does not want to have the milking turned off).

Further, the present invention may comprise notification only at certain times, e.g. in daytime, and notifications may be of different levels.

The pre-selection of cows may be performed automatically, i.e. be triggered by a certain event such as in case of illness.

In the case of a plurality of notifying stations, the notifying includes preferably an identification of the animal station that is visited by the pre-selected cow.

The user may be notified via a telephone, a mobile phone, a pager or a Bluetooth compatible unit. The notification may be a voice or text message. Alternatively, the user is notified via an alarm signal, particularly a sound alarm.

In these instances the processing and control device 32 is provided with, or alternatively connected, to a suitable transmitter or an alarm generator (not shown in FIG. 1).

It will be obvious that the invention may be varied in a plurality of ways. Such variations are not to be regarded as a departure from the scope of the invention. All such modifications as would be obvious to one skilled in the art are intended to be included within the scope of the appended claims.

The invention claimed is:

1. A method for automatically notifying a user of a dairy farm, wherein milking animals are allowed to move freely in an area intended therefore and to visit individually an automatic milking station located in said area, said user being at a location remote to said milking station, and said milking station being configured for automatic milking of the milking animals and including an animal identification system and a database of the milking animals, the method comprising the steps of:

receiving a pre-selection of a particular one of the milking animals;

storing in the database an indication that the particular one of the milking animals is a pre-selected milking animal;

identifying each milking animal that enters the milking station;

referring to the database for establishing, for each milking animal that enters the milking station, if the milking animal is a pre-selected milking animal;

notifying the remotely-located user of the pre-selected milking animal when the pre-selected milking animal enters the milking station to provide the remotely-located user with a notification of where said pre-selected milking animal is at a given time; and halting operation of the milking station until the notified, remotely-located user has moved to the milking station and found the pre-selected milking animal.

2. The method as claimed in claim 1, wherein said milking animals are cows.

3. The method as claimed in claim 1, wherein the pre-selection is received from the user of the dairy farm.

4. The method as claimed in claim 1, wherein the pre-selected milking animal is a milking animal, which is to be examined, to be treated, to be rubbed with an ointment or a salve, or to be given a drug or a medicament.

5. The method as claimed in claim 1, wherein the pre-selected milking animal is a milking animal, which is anxious or nervous, or which is not used to the milking station.

6. The method as claimed in claim 1 wherein the milking station is provided with an automatic milking machine, further comprising the step of halting the automatic milking machine in dependence on the pre-selected milking animal entering the milking station.

7. The method as claimed in claim 1, wherein the user is notified via a telephone, a mobile phone, a pager or a wireless network, via a voice or text message, or via an alarm signal.

8. The method as claimed in claim 1, wherein the dairy farm comprises at least a further milking station, which may be visited individually by the freely moving milking animals, each of said milking stations comprising an animal identification system and sharing a common database of the milking animals, wherein the step of identifying comprises identifying each milking animal that visits the further milking station, wherein the step of notifying comprises notifying the user of the dairy farm of the pre-selected milking animal in dependence on the pre-selected milking animal visiting the further milking station, and wherein the step of notifying includes an identification of the milking station that is visited.

9. A method for automatically notifying a user of a dairy farm, wherein milking animals are allowed to move freely in an area intended therefore and to visit individually an automatic milking station located in said area, said user being at a location remote to said milking station, and said milking station comprising an automatic milking machine for automatic milking of the milking animals, an animal identification system and a database of the milking animals, the method comprising the steps of:

receiving a pre-selection of a particular one of the milking animals;

storing in the database an indication that the particular one of the milking animals is a pre-selected milking animal;

identifying each milking animal that enters the milking station;

referring to the database for establishing, for each milking animal that enters the milking station, if the milking animal is a pre-selected milking animal;

notifying the remotely-located user of the pre-selected milking animal when the pre-selected milking animal enters the milking station to provide the remotely-located user with a notification of where said pre-selected milking animal is at a given time; and halting operation of the automatic milking machine of said milking station until the notified, remotely-located user has moved to the milking station and found the pre-selected milking animal, wherein the pre-selected milking animal is a milking animal, which is anxious or nervous, which is not used to the animal station or which is to be treated or inspected.

* * * * *